(12) United States Patent
Abanami et al.

(10) Patent No.: US 7,500,199 B2
(45) Date of Patent: Mar. 3, 2009

(54) GENERATING STYLISTICALLY RELEVANT PLACEHOLDER COVERS FOR MEDIA ITEMS

(75) Inventors: Thamer A. Abanami, Seattle, WA (US); Jeffrey C. Fong, Seattle, WA (US); Julian Selman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 11/102,459

(22) Filed: Apr. 7, 2005

(65) Prior Publication Data

US 2006/0230331 A1    Oct. 12, 2006

(51) Int. Cl.
  G06F 3/00    (2006.01)
  G06F 17/00   (2006.01)
  G06F 7/00    (2006.01)
(52) U.S. Cl. ............. 715/744; 715/243; 707/104.1
(58) Field of Classification Search ......... 715/745, 715/744, 542, 517, 243, 764; 707/104.1
  See application file for complete search history.

(56) References Cited

U.S. PATENT DOCUMENTS

| 2002/0049847 | A1* | 4/2002 | McArdle et al. | 709/227 |
| 2002/0167683 | A1* | 11/2002 | Hanamoto et al. | 358/1.14 |
| 2003/0135513 | A1* | 7/2003 | Quinn et al. | 707/102 |
| 2003/0236582 | A1* | 12/2003 | Zamir et al. | 700/94 |
| 2003/0237043 | A1* | 12/2003 | Novak et al. | 715/500.1 |
| 2006/0010472 | A1* | 1/2006 | Godeny | 725/62 |

* cited by examiner

Primary Examiner—Ting Zhou
(74) Attorney, Agent, or Firm—Lee & Hayes, PLLC

(57) ABSTRACT

Stylistically relevant cover images for media items are generated based on metadata for the media items. The cover images are placeholders that visually represent the media items until original cover images (if any) are found. In one implementation, the cover images incorporate design elements like font, background art, color schemes, and layout that are chosen from a collection of such elements based on the metadata. The cover images are therefore unique and stylistically relevant to corresponding media items.

18 Claims, 4 Drawing Sheets

GENERATING STYLISTICALLY RELEVANT PLACEHOLDER COVERS FOR MEDIA ITEMS

TECHNICAL FIELD

The present invention relates generally to techniques for presenting graphical images that are representative of media items, such as music, movies, books, video games, and the like.

BACKGROUND

Many consumers are familiar with online services that permit shopping and purchase of entertainment media items, such as music CDs, books, movie DVDs, and video games. Some services, such as the MSN® Music website hosted by Microsoft Corporation, allow users to download purchased items, such as individual songs.

Many of the popular online services provide a rich and colorful browsing experience for the consumer. Web pages are arranged with thumbnail images depicting the covers of various media items, such as CD covers, front book covers, movie DVD covers, and video game covers. When a user purchases a media item and stores it on her playback device, the corresponding cover image can be obtained and presented to the user anytime the media item is handled by the device (e.g., listed in a playlist or menu, or played back).

In another common scenario, a user purchases physical media and wants to store a copy of the media data on his computer. For example, suppose the user buys a music CD and wants to "rip" the CD to his computer. The digital version of the album art can be fetched using an online database service and then used by the computer when browsing music. The digital album art may then be available for transfer to a portable device and used when browsing music on that device.

However, cover images tend to be limited to the most popular media items. In a growing number of cases, media items may not have accompanying cover images, or such cover images may not be readily available. As a result, when the user adds the media item to her library, there is no corresponding cover image to present to the user. It would be useful to remedy this situation so that the consumer experience is not lessened when encountering such media items.

SUMMARY

Stylistically relevant cover images for media items are generated based on metadata for the media items. The cover images are placeholders that visually represent the media items until original cover images (if any) are found. In one implementation, the cover images incorporate design elements like font, background art, color schemes, and layout that are chosen from a collection of such elements based on the metadata. The cover images are therefore unique and stylistically relevant to corresponding media items.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

The following disclosure describes techniques for generating and presenting placeholder cover images for media items, such as music CDs, movie DVDs, books, video games, and other items that can be represented with an artistic cover. The media items are packaged with associated covers that are used in marketing to consumers. The covers are graphically unique and provide information about the media item, such as its title and the people who had a hand in its development (e.g., author, game developers, actors, producers, etc.). For popular media items, graphical or thumbnail images (or simply "thumbnails") depicting the covers are sometimes produced to represent the media items in a user interface setting. The cover images lend familiarity to the product and provide a rich and colorful experience for the user when, for example, he is browsing a collection of media items at a website, or viewing a playlist of media items.

As digital media libraries have grown, there are many media items that may not have associated cover images. For instance, rare or obscure media items, limited edition media items, or self-published media items may not have accompanying cover images. There are also a growing number of websites that might offer media items without providing the cover thumbnails, even if one exists. Additionally, many computers and portable media devices are designed to support playback of different media types and to present rich graphical experiences when users navigate through playlists and playback selected media items. When cover images are not available, the user experience when browsing media libraries containing such media items can be less appealing.

For these cases, the techniques described in this disclosure generate placeholder cover images to represent the media item in place of the legitimate cover image. The placeholder cover images are generated to be stylistically relevant to the media item based on metadata associated with the media item. The placeholder cover image is saved and associated with the media item, and used in conjunction with the media item when the user navigates playlists, selects the item for playback, and so forth. If the original cover image is ever obtained, it can replace the placeholder cover image for future use with the media item.

The following discussion is directed to cover generation, which may be implemented in a wide variety of contexts. For discussion purposes, the techniques are described within the context of different user devices that can access media items and metadata in a web-based architecture.

Exemplary Architecture

Figure 1:
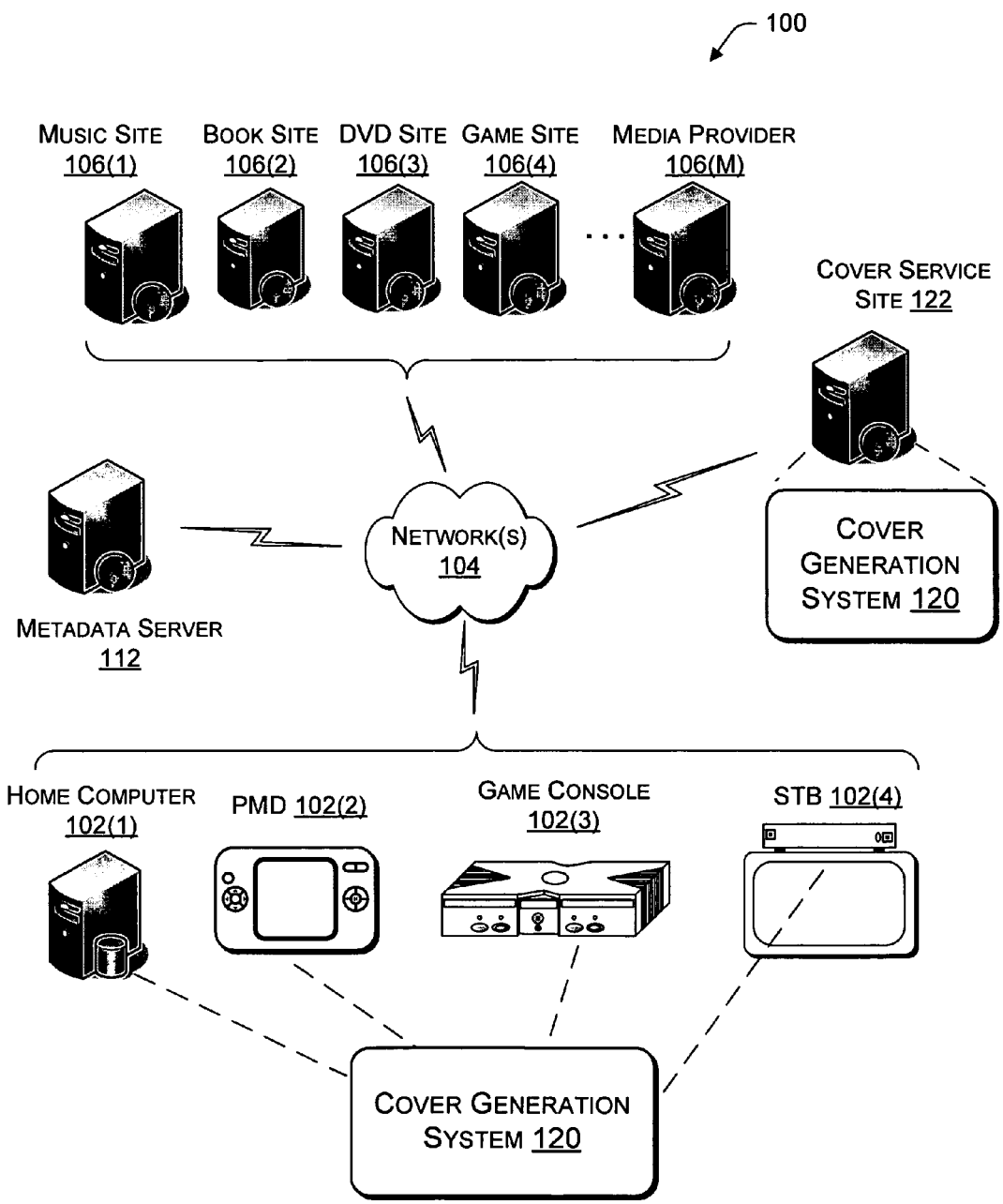
FIG. 1 illustrates an architecture in which media items may be purchased and played on a variety of user devices. The architecture represents an exemplary environment in which stylistically relevant placeholder cover images may be generated and used to visually represent those media items that lack original cover images.

FIG. 1 illustrates an architecture 100 that represents an exemplary environment in which stylistically relevant cover images may be generated for various media items. Architecture 100 includes any number of user devices that can generate cover images for the media items. In this illustration, representative devices include a home computer 102(1), a portable media device (PMD) 102(2), a video game console 102(3), and a set-top box (STB) 102(4). However, there are many other possible device configurations, such as portable computers, personal digital assistants (PDAs), audio players, satellite receivers, digital video recorders (DVRs), information appliances, cellular phones, and so forth.

The user devices 102(1)-102(4) are equipped with hardware and software that provide users a rich media experience. For example, home computer 102(1) may be equipped with an operating system tailored for handling media (e.g., Windows® XP Media Center Edition operating system) and media playback applications (e.g., Windows® Media Player application). Portable media device 102(2) may be designed with disk memory and an operating system (e.g., Windows® Mobile-based Portable Media Center) to support digital music, movies, games, and so on. Game console 102(3) (e.g., Microsoft's Xbox gaming system) offers a platform for video games, music, and DVD movies.

The user devices 102(1)-102(4) can connect to a network 104 to access one or more media providers 106(1), 106(2), . . . , 106(M) that market, host, and/or serve media items such as music, books, movies, video games, and the like. Representative providers might include a music website 106(1) that sells individual songs and music CDs, a book website 106(2) that markets new and used books, a DVD website 106(3) that promotes DVDs, and a game website 106(4) that markets and/or hosts video games. The providers may also include other content providers, represented by media provider 106(M), which distribute media items to the client devices 102 via the network 104. Examples of such media providers might be cable-based and satellite-based content distributors. The network 104 is representative of many different types of networks, such as cable networks, the Internet, and wireless networks.

The user devices 102(1)-102(4) can store media items in memory as part of a media library. The media items may be downloaded from one or more media providers 106(1)-106(M) or transferred from a portable storage media, such as a CDROM (not shown). When a media item is added to the media library, the device 102 retrieves metadata for the media item from a metadata server 112. Metadata describes aspects of media items, such as title, year produced, artist/author, genre, and so forth. As an example, consider metadata for a music album. It might include:

Album title
Individual song titles
Album artist (or if different, track artists)
Year album was released
String lengths of the titles and artist names
Genre of music
Producers
Distribution company
Record Label
Country of Release
Composer
Notes Online services like Gracenote's CDDB® service and AMG's allmusic service store and serve metadata for songs and albums.

The metadata may or may not contain an accompanying cover image that visually represents the media item. If a cover image is provided, the user device 102 presents the original cover image in user interface formats (e.g., menus, playlists, playback screens, etc.) to provide the rich browsing and playback environments. However, if no cover image is provided with the metadata, a placeholder cover image is generated and used with the media item until a time when the original cover image (if one exists) is found.

A cover generation system 120 is implemented at the user devices 102(1)-102(4) to generate the placeholder cover image based on the metadata for the media item. The cover generation system 120 can be implemented in software that is stored and executed on the devices. The cover generation system 120 uses the metadata to select and arrange design elements that are stylistically relevant to the media item. The cover image is then generated with these design elements. As an alterative, an online service 122 may implement a cover generation system 120 to generate placeholder cover images that can be served to the user devices 102(1)-102(4).

The placeholder cover images are stored in association with the media items. Thus, whenever the device 102 presents a UI identifying a particular media item, the associated placeholder cover image is depicted in the UI as a visual cue to the media item.

The cover generation system 120 can be further configured to periodically or occasionally check for the original cover image to see if it becomes available. If the original cover image is subsequently available, the cover generation system replaces the placeholder cover image with the original cover image.

Client Device

Figure 2:
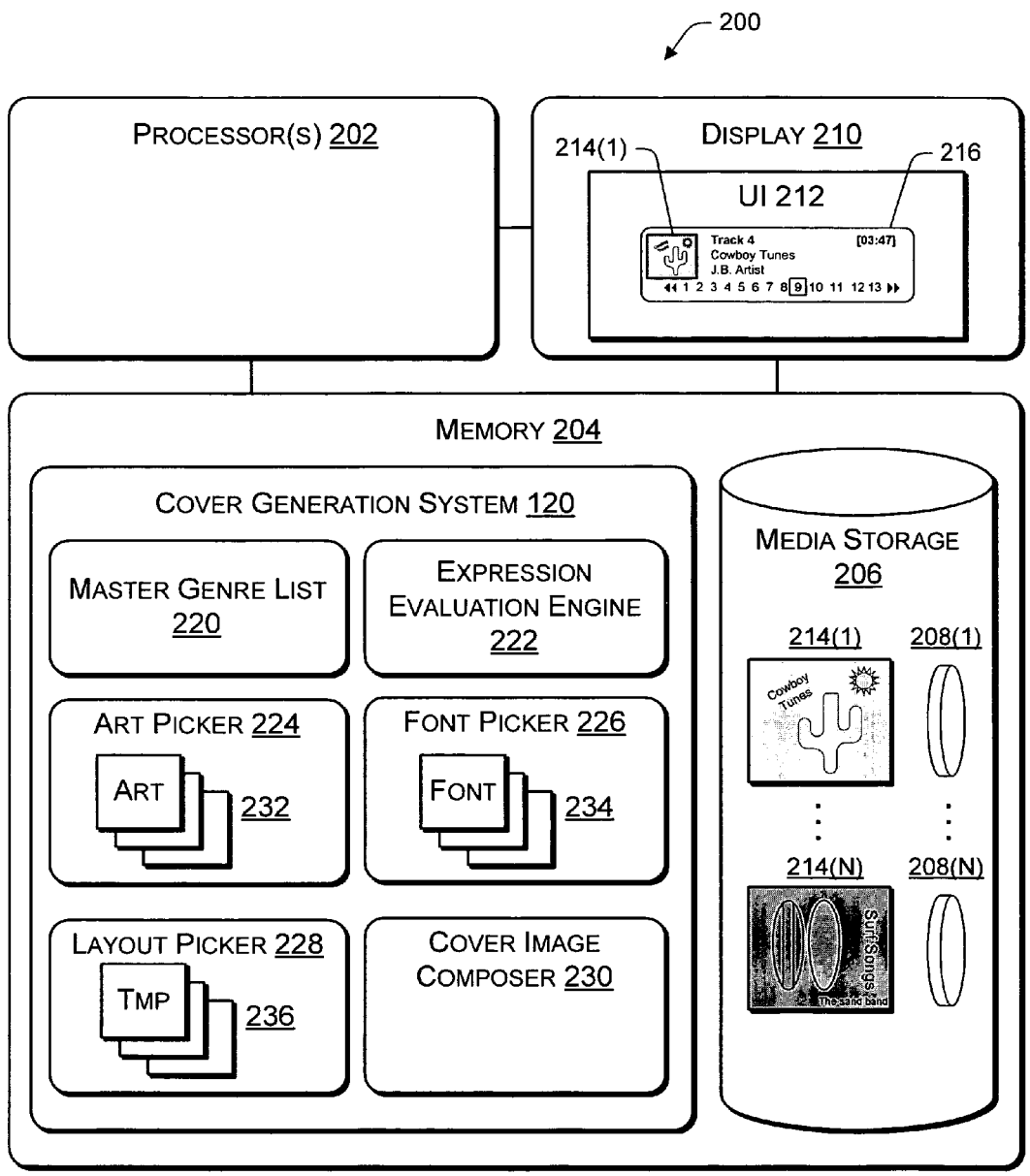
FIG. 2 is a block diagram of a computing device that implements a cover generation system.

FIG. 2 shows a representative user device 200 implemented with the cover generation system 120. The device 200 includes one or more processors 202 and memory 204. The processor(s) 202 process various instructions and execute applications stored in memory 204 and communicate with other computing devices. The processor(s) 202 may further include a content processor to receive, decode, and process media items (e.g., audio files, video files, game files, etc.) stored in the memory 204.

The memory 204 encompasses different types of memory components, including both volatile and non-volatile memory. Examples of memory components include RAM (random access memory), ROM (read only memory), flash, disk memory, RAID systems, recordable and/or rewritable discs, and so forth. The memory 204 has program memory to store application programs, including the cover generation system 120, media playback applications (not shown), and an operating system (not shown). The memory 204 also includes media storage 206 to store many media items 208(1), . . . , 208(N). Depending upon the device and its storage capacity, the media items 208(1)-208(N) may be music files, video files, video game files, digital books, and the like.

The device 200 is optionally equipped with a display 210 to depict a user interface (UI) 212. Home computer 102(1) and portable media device 102(2) are examples of devices with a display 210. Other devices, such as game console 102(3) and set top box 102(4), may not be equipped with a display, but instead have a display output port for connection to a separate display (e.g., TV) that depicts the UI 212.

The cover generation system 120 generates placeholder cover images 214(1), . . . , 214(N) for corresponding media items 208(1)-208(N) that do not already have an accompanying cover image. The cover images 214(1)-214(N) are associated with the corresponding media items 208(1)-208(N), such as via a data structure stored in media storage 206 or by storing IDs of the media items with the cover images. When the device 200 wishes to represent a particular media item 208, the device retrieves the associated cover image 214 from the media storage 206 and presents it as part of the UI 212. In this illustration, the device is playing a song from an album titled, "Cowboy Tunes". A feature box 216 depicted on the UI 212 shows the album that is currently playing. The placeholder cover image 214(1) is arranged in the feature box 216 to convey to the user that the album title "Cowboy Tunes" is playing.

The placeholder cover images 214 are stylistically relevant to the associated media item. The relevance and style are derived from the metadata associated with the media item. Suppose the media item 208(1) is a collection of country-western songs. The cover generation system 120 examines the metadata for the music file and discovers that the album title is "Cowboy Tunes", the album was released in 1975, and the music has a country-western genre. Based on such metadata, the cover generation system 120 creates a stylistically relevant cover image 214(1) having artistic elements related to a western theme (e.g., cactus and sun) overlaid on a color background appropriate for the time period of 1975. The album title "Cowboy Tunes" is presented in a font that is appropriate for a country theme.

As a second example, suppose the media item 208(N) is a music file of songs having a beach genre. The metadata for the media item 208(N) also contains the album title "Surf Songs", the group's name "The Sand Band", and the release date of 1964. From the metadata, the cover generation system 120 creates a stylistically relevant cover image 214(N) having artistic elements the people relate to a beach setting (e.g., surf boards) overlaid on a color and graphical background that is appropriate for the beach culture in 1964. The album title "Surf Songs" and group name "The Sand Band" are printed in a font and arranged in a topographical layout suggestive of the mid-60s time period.

In one implementation, the cover generation system 120 includes a master genre list 220, an expression evaluation engine 222, an art picker module 224, a font picker module 226, a layout picker module 228, and a cover image composer 230. In other implementations, there may be more or fewer modules that together generate cover images.

The master genre list 220 is a listing of all genres of interest. Genres may be added to or removed from the master list. User defined genres may also be specified and added to the master list. Each genre may have multiple instances of text describing the genre. Each listed genre sets forth various stylistic rules for generating a stylistically relevant image.

The expression evaluation engine 222 examines the metadata elements that pertain to genre and ascertains a genre for the media item. In one implementation, the engine 222 parses the metadata element to find key terms and then performs key word searching of the master genre list 220 to identify one of the genres in the list. The parsing allows a better understanding of the metadata elements. For example, the "country" genre may be expressed in a number of ways, including "country", "western", "country & western", "country western", "country and western" and so on. Once a genre is identified, it is used by the art picker 224, font picker 226, and layout picker 228 to choose the appropriate background art, fonts, and layout, respectively.

The art picker module 224 chooses the background art for the cover image based on the genre selected by the expression evaluation engine 222 and other elements of the metadata, such as year, title, artist name, length of strings in title and artist name, and so forth. The art picker module 224 maintains a collection of background art 232 for each media type. Each piece of art has one or more associated tags that are used to match it with a genre or set of genres identified by the engine 222. One or more of the matched art pieces 232 are then used in the placeholder cover image to convey relevance to the media item.

The font picker module 226 chooses a font for the printed information on the cover image. The font is selected based on elements of the metadata, such as the year released, and optionally the genre identified by the expression evaluation engine 222. Each font has an associated tag for use in matching the font to a range of years and the genre. The font picker module 226 may have its own custom set of fonts 234, or rely on fonts from the underlying operating system. The font is then used to draw the text portions of the placeholder cover image.

The layout picker module 228 selects a topographical layout for the elements that go into the cover image. The layout picker 228 has a collection of templates 236 that can be used in the generation of the cover image. The templates contain formatting and arrangement information, specifying where elements are placed on the image, how they are oriented, and so forth. One of the templates 236 is chosen based on elements of the metadata, such as the year released, and optionally the genre identified by the expression evaluation engine 222. Each template has an associated tag for use in matching the layout to the relevant time period and possibly the genre.

The cover image composer 230 gathers the background art selected by the art picker 224, the font chosen by the font picker 226, and the layout template picked by the layout picker 228 and assembles a cover image according to the genre identified by the expression evaluation engine 222. The cover image composer 230 strives to create an image that is unique to the media item. The composer 230 saves the image as a graphics file (e.g., jpeg) and stores the file in the media storage 206 in association with the media item 208. The image may be a small, thumbnail image, or a larger image. In some cases, the composer 230 may create multiple images of different size and resolution for presentation in different settings.

The cover generation system 120 may be configured to create one cover image for each media item. To ensure uniqueness, the cover generation system 120 may remember previous designs and eliminate the combination of stylistic elements from being assembled and arranged in the same fashion. This will promote a richer experience when the user has many media items in similar genres.

Generating Stylistic Covers

Figure 3:
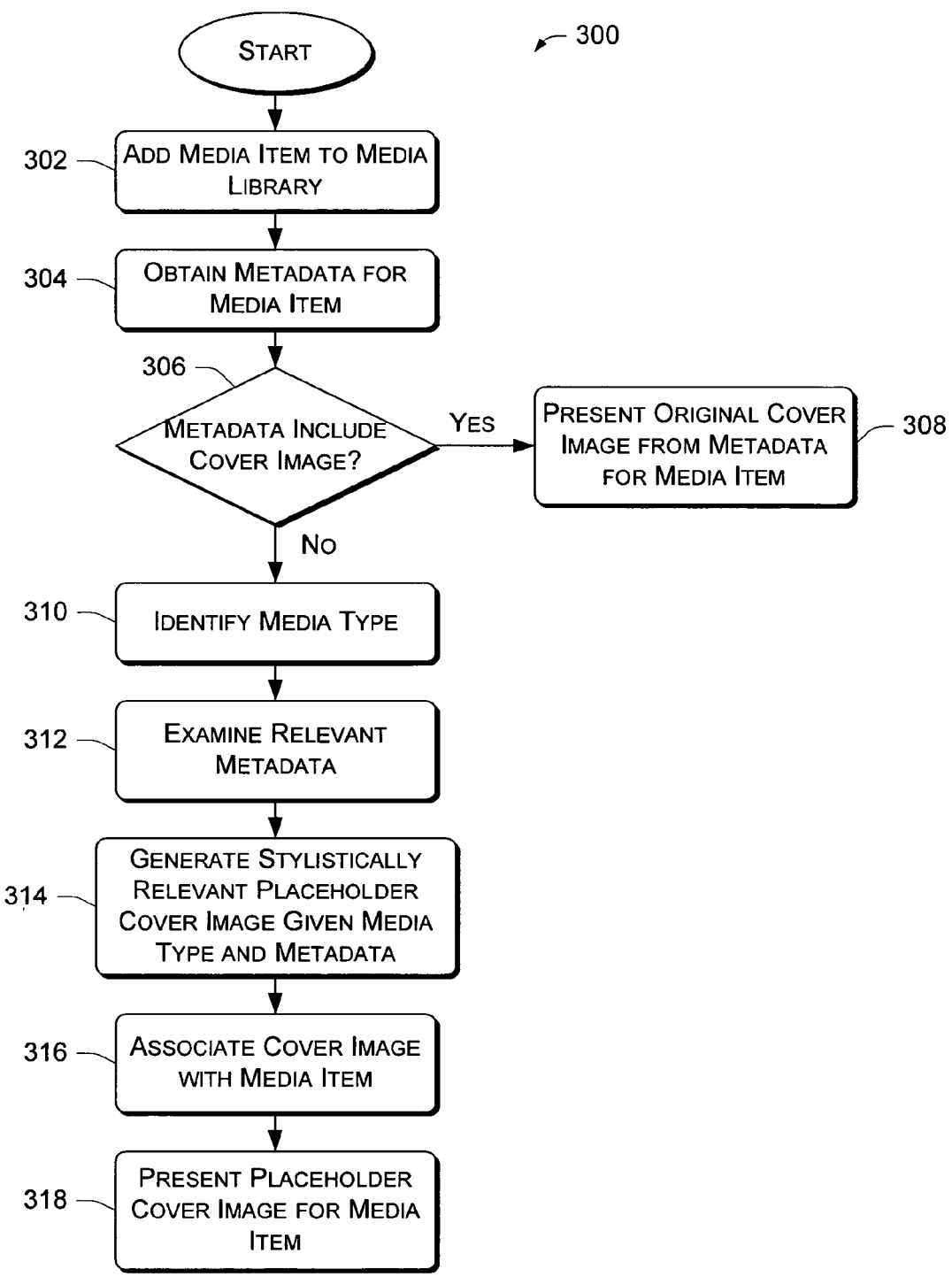
FIG. 3 is a flow diagram of a process for creating stylistically relevant placeholder cover images for media items.

FIG. 3 shows a process 300 for creating stylistically relevant placeholder cover images for media items. The process 300 is illustrated as a collection of blocks in a logical flow graph, which represent a sequence of operations that can be implemented in hardware, software, firmware, or any combination thereof. In the context of software and/or firmware, the blocks represent computer instructions that, when executed by one or more processors, perform the recited operations.

For discussion purposes, the process 300 is described with reference to the device 200 of FIG. 2 and architecture 100 of FIG. 1. It is noted that the process 300 may be implemented by other device implementations and architectures.

At block 302, a media item is added to the media library of the user device 200. In the example illustration of FIG. 2, a library of music files 208(1)-208(N) is stored in media storage 206. Individual music files or collections of music files may be added to the library by transferring them from a portable storage media (e.g., CD) or by downloading the files from online services, such as the music site 106(1) in FIG. 1.

At block 304, metadata for the media item is obtained. The metadata may accompany the media item or it may be retrieved from an online service represented by the metadata server 112 in FIG. 1. The metadata contains information about the media item.

The metadata is examined to determine if it includes an original cover image for the media item (block 306). If the metadata includes the original cover image (i.e., the "yes" branch from block 306), the device 200 uses the original cover image in UI 212 when representing the associated media item. Conversely, if the cover image is not part of the metadata (i.e., the "no" branch from block 306), the media type is identified (block 310). That is, the device 200 determines whether the media item is a musical work, a book, a DVD movie, a video game, and so forth.

Once the media type is identified, the relevant elements of the metadata are examined (block 312). Different elements may be more or less useful when considering a particular media type. For instance, the year released may be more useful for choosing a background art and color scheme for an album cover than for a video game cover.

At block 314, a stylistically relevant placeholder cover image is generated based on the metadata elements relevant to the media type. The cover generation system 120 uses the expression evaluation engine 222 to look at the "genre" metadata and identifies the appropriate genre in the master genre list 220. The genre is then used by the picker modules 224, 226, and 228 to pick appropriate background art, fonts, and layout templates. One particular example of this operation is described below with reference to FIG. 4.

At block 316, the cover image is associated with the media item. For example, the cover image is stored in the media storage 206 and related to the corresponding media item via a data structure. Subsequently, anytime the device intends to identify the media item, such as in menus, playlists, or playback screens, the associated placeholder cover image is retrieved and presented on the UI to represent the media item (block 318). In the event that the original cover image ever becomes available (if one exists), the device may substitute the original cover image for the placeholder cover image 214.

Figure 4:
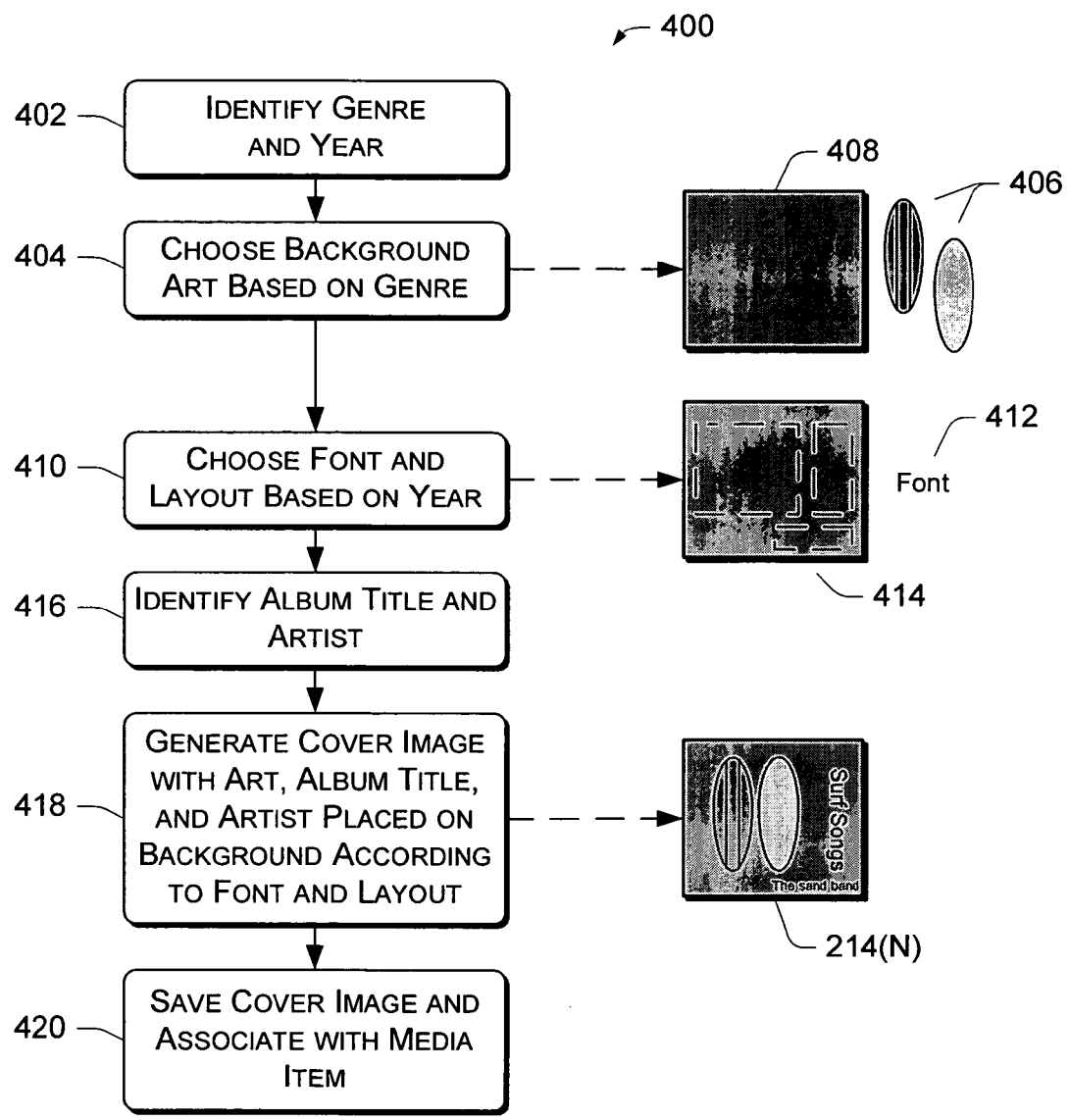
FIG. 4 is a flow diagram of a process for generating the placeholder cover images based on metadata associated with the media items.

FIG. 4 shows a process 400 for generating the placeholder cover images based on the metadata associated with the media items. For discussion purposes, the process 400 is described in the context of generating the placeholder cover image 214(N) for the music album "Surf Songs".

At block 402, the genre and year elements are ascertained from the metadata. One or more pieces of background art are chosen for the cover image based on the genre (block 404). As one example of this operation, the art picker module 224 of device 200 searches the background art collection 232 to find pieces with tags matching the genre. For a beach genre, for example, the art picker module 224 selects art with thematic elements associated with a beach, such as the surf board elements 406. The art picker module 224 may also choose a background pattern and color scheme, as represented by the colored background element 408.

At block 410, a font and layout are selected based on the year. As one example, the font picker 226 of device 200 searches the collection of fonts 234 to find one that is appropriate for the time period. The layout picker 228 selects a template that reflects the style of the time period. In our example, the album titled "Surf Songs" was released in 1964. Thus, the font picker 226 selects a font that has the look and feel of the mid-60s, as represented by the twentieth century poster font 412. The layout picker 228 chooses a template 414 that arranges the art elements in the upper left portion of the background, positions the title vertically along the right edge, and places the artist name in a lower-right hand area, as represented by the dashed blocks in template 414.

At block 416, the album title and artist are extracted from the metadata. In our example, the album title is "Surf Songs" and the artist is a group named "The Sand Band". At block 418, the various elements are assembled and a cover image is generated according to the selected font and layout template. As shown here, the surf board elements 406 are arranged on the background 408 according to the layout template 414. The title "Surf Songs" and artist name "The Sand Band" are printed in the twentieth century poster font 412, and arranged on the background 408 according to the template 414. The image composer then produces the final image 214(N) that pulls together all of these elements. The cover image 214(N) is stylistically relevant to the music album of beach tunes and hence conveys something particularly useful about the music album when the user views the image.

At block 420, the cover image is saved and associated with the media item. It is then available to be displayed in media views across the system.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   obtaining metadata for a media item, wherein the metadata comprises a genre of the media item and at least one other piece of information selected from a group comprising:
      a year that the media item was released;
      a title of the media item;
      an artist name;
      a producer name;
      a distributor name;
      a string length of the title; and
      a string length of the artist;
   based on the metadata, generating a cover image to represent the media item in a user interface, the cover image being stylistically relevant to the media item;
   presenting the cover image as part of the user interface during navigation and playback of the media item;
   periodically check to see if an original cover image corresponding to the media item becomes available, the original cover image being provided by online services; and
   in response to the original cover image becoming available, replacing the cover image with the original cover image.

2. A method as described in claim 1, wherein the media item is selected from a group of items comprising music, movies, video games, books, and other items that can be represented with an artistic cover.

3. A method as described in claim 1, wherein the obtaining comprises downloading the metadata over a network.

4. A method as described in claim 1, wherein The generating comprises creating a cover image having one or more elements selected from a collection of elements based upon the genre and the other piece of information in the metadata.

5. A method as described in claim 1, further comprising:
   selecting background art from a collection of art based on the metadata;
   selecting a font from a custom set of fonts based on the metadata;
   selecting a layout template from a collection of layout templates based on the metadata; and
   generating the cover image with the selected background art, text written in the selected font, and arranged according to the selected layout template.

6. A method as described in claim 1, further comprising associating the cover image with the media item.

7. A computer-readable media comprising computer-executable instructions that, when executed, direct a device to:
   store a media item;
   obtain metadata for the media item, the metadata specifying a genre and at least one other piece of information about the media item;
   identify the genre of the media item from the metadata;
   use the genre and the other piece of information to select design elements from a collection of design elements and to arrange the selected design elements;
   generate a cover image that represents the media item, the cover image being composed of the selected and arranged design elements;
   associate the cover image with the media item;
   periodically check to see if an original cover image corresponding to the media item becomes available, the original cover image being provided by online services; and
   in response to the original cover image becoming available, replacing the cover image with the original cover image.

8. A computer-readable media as recited in claim 7, wherein the other piece of information is selected from a group of information comprising a year that the media item was released, a title of the media item, an artist name, a producer name, a distributor name, a string length of the title, and a string length of the artist.

9. A computer-readable media as recited in claim 7, wherein the design elements have associated tags that specify one or more genres or other information so that the design elements, when selected, are relevant to the media item.

10. A computer-readable media as recited in claim 7, wherein the design elements comprise at least one of background art, color scheme, graphics, and font type.

11. A computer-readable media as recited in claim 7, further comprising computer-executable instructions that, when executed, direct a device to:
   select a background art from a collection of art based on at least one of the genre and the other piece of information;
   select a font type from a custom set of fonts based on at least one of the genre and the other piece of information;
   select a layout template from a collection of layout templates based on at least one of the genre and the other piece of information; and
   generate the cover image with the selected background art, text written in the selected font, and arranged according to the selected layout template.

12. A computer-readable media as recited in claim 7, further comprising computer-executable instructions that, when executed, direct a device to present the cover image in a user interface.

13. A device comprising:
   a storage medium to store a media item and a cover image;
   a processor; and
   the computer-readable media as recited in claim 7, operatively coupled to the processor, so that when the processor executes the computer-executable instructions, the device generates the cover image.

14. A computer-readable media as recited in claim 7, wherein the media item is selected from a group of items consisting of music, movies, video games and books.

15. A computer-readable media as recited in claim 7, wherein the cover image is a placeholder cover image that visually represents the media item until an original cover image is found; and
   the cover image is presented as part of a user interface during navigation and playback of the media item.

16. A device comprising:
   memory to store a media item, the media item having corresponding metadata that describes the media item;
   a processor coupled to the memory;
   a cover generation system stored in the memory and executable on the processor, the cover generation system selecting background art from a collection of art, at least one font, and a layout template from a collection of layout templates based on the metadata, the cover generation system generating a cover image to represent the media item wherein the cover image arranges the selected background art and textual elements written in the selected font according to the selected layout template; and
   a user interface that presents the cover image during user navigation and playback of the media item, wherein:
      the processor periodically checks to see if an original cover image corresponding to the media item becomes available, the original cover image being provided by online services; and
      in response to the original cover image becoming available, the processor replaces the cover image with the original cover image.

17. A device as described in claim 16, wherein the cover generation system comprises a list of genres and an expression evaluation engine that uses the metadata to identify a genre from the list that is appropriate for the media item.

18. A device as described in claim 16, wherein the background art and layout templates have associated tags that specify one or more pieces of information found in the metadata, the cover generation system selecting the background art, the font, and the layout template by matching the tags to the information in the metadata.

* * * * *

UNITED STATES PATENT AND TRADEMARK OFFICE
CERTIFICATE OF CORRECTION

| | | |
|---|---|---|
| PATENT NO. | : 7,500,199 B2 | |
| APPLICATION NO. | : 11/102459 | |
| DATED | : March 3, 2009 | |
| INVENTOR(S) | : Thamer A. Abanami et al. | |

It is certified that error appears in the above-identified patent and that said Letters Patent is hereby corrected as shown below:

In column 8, line 54, in Claim 4, delete "The" and insert -- the --, therefor.

Signed and Sealed this
Nineteenth Day of April, 2011

David J. Kappos
*Director of the United States Patent and Trademark Office*